April 9, 1957     A. B. DAVIDSON     2,788,127
APPARATUS FOR TREATING SEWAGE
Filed April 22, 1952     3 Sheets-Sheet 2
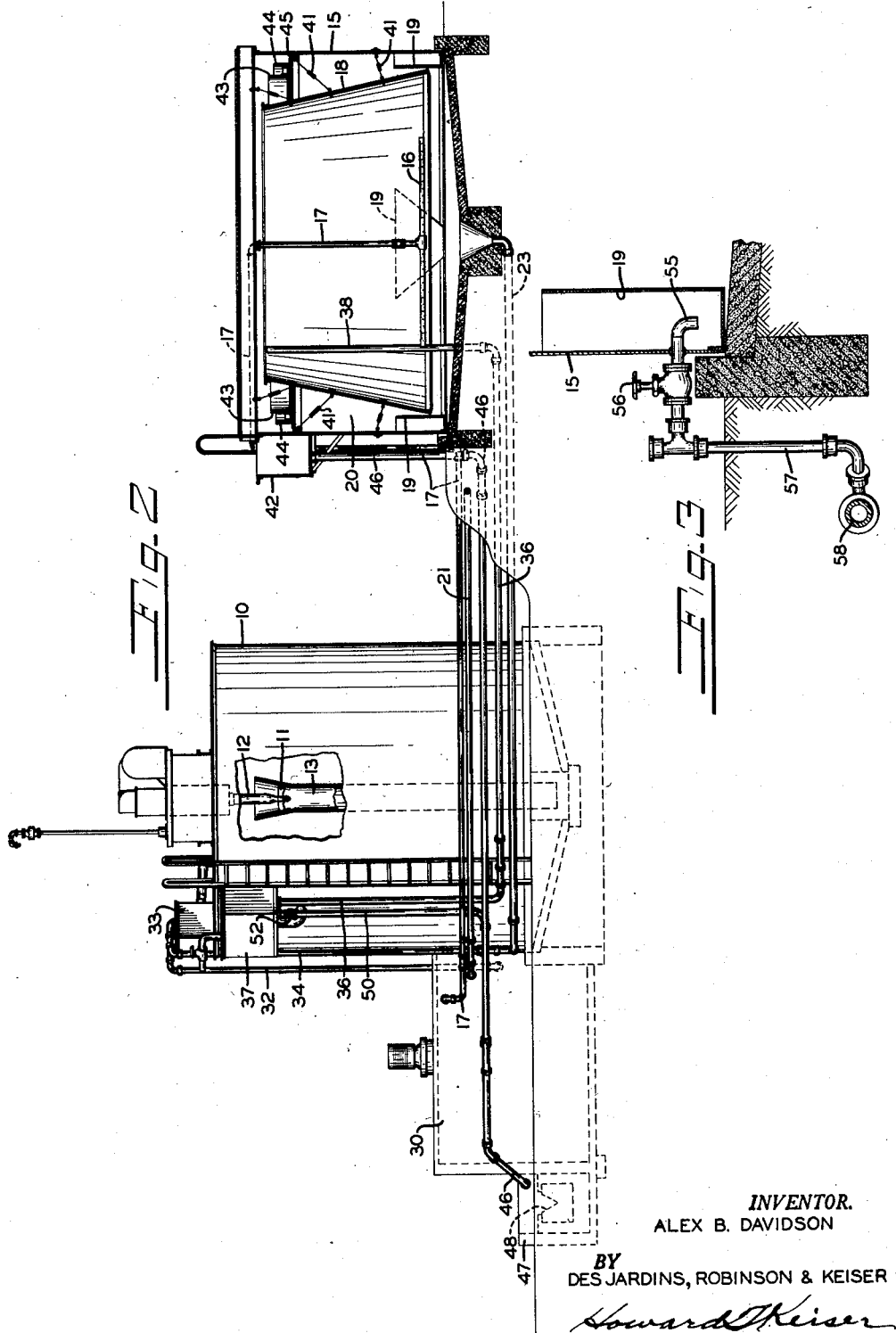
INVENTOR.
ALEX B. DAVIDSON
BY
DES JARDINS, ROBINSON & KEISER
HIS ATTORNEYS

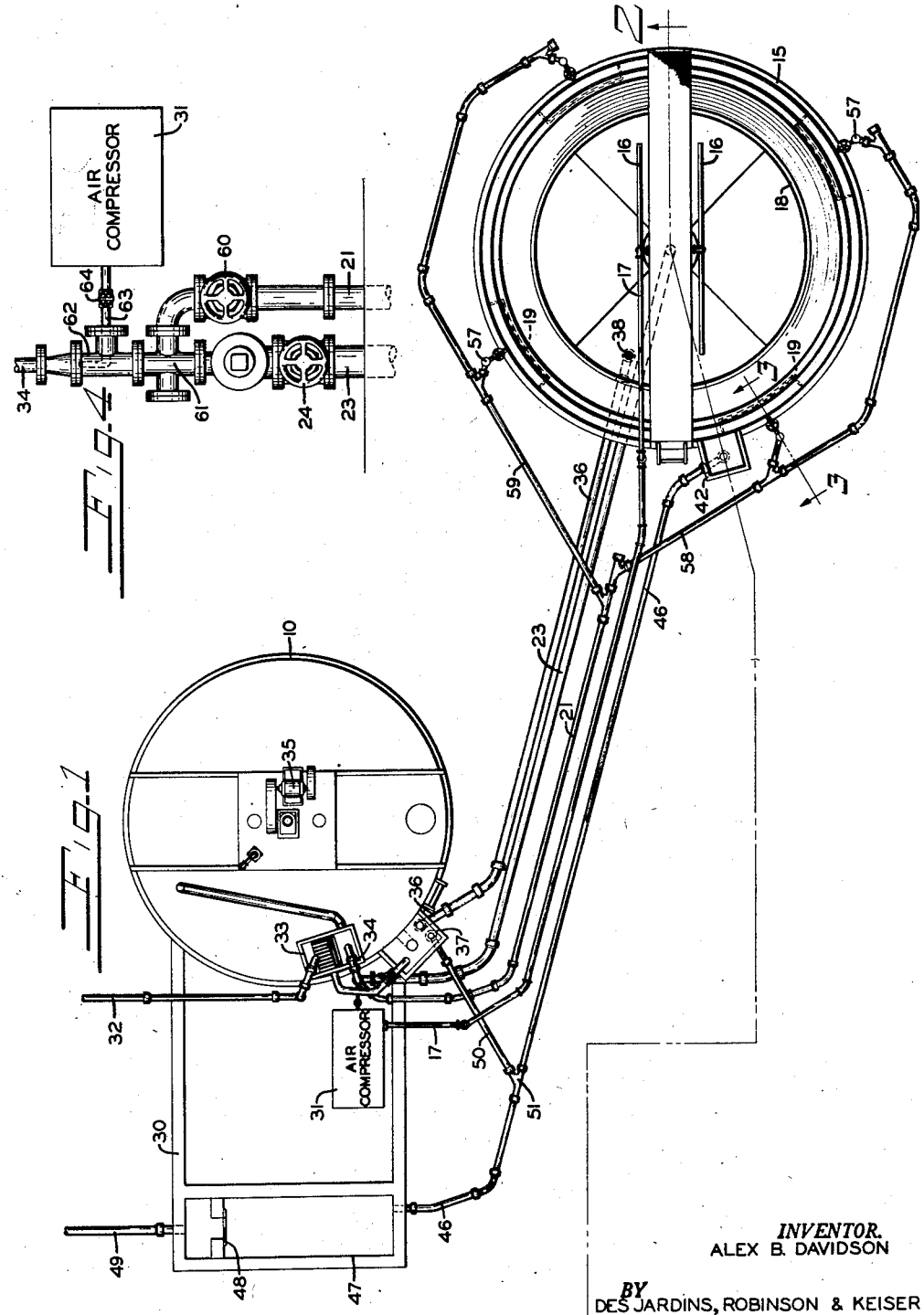

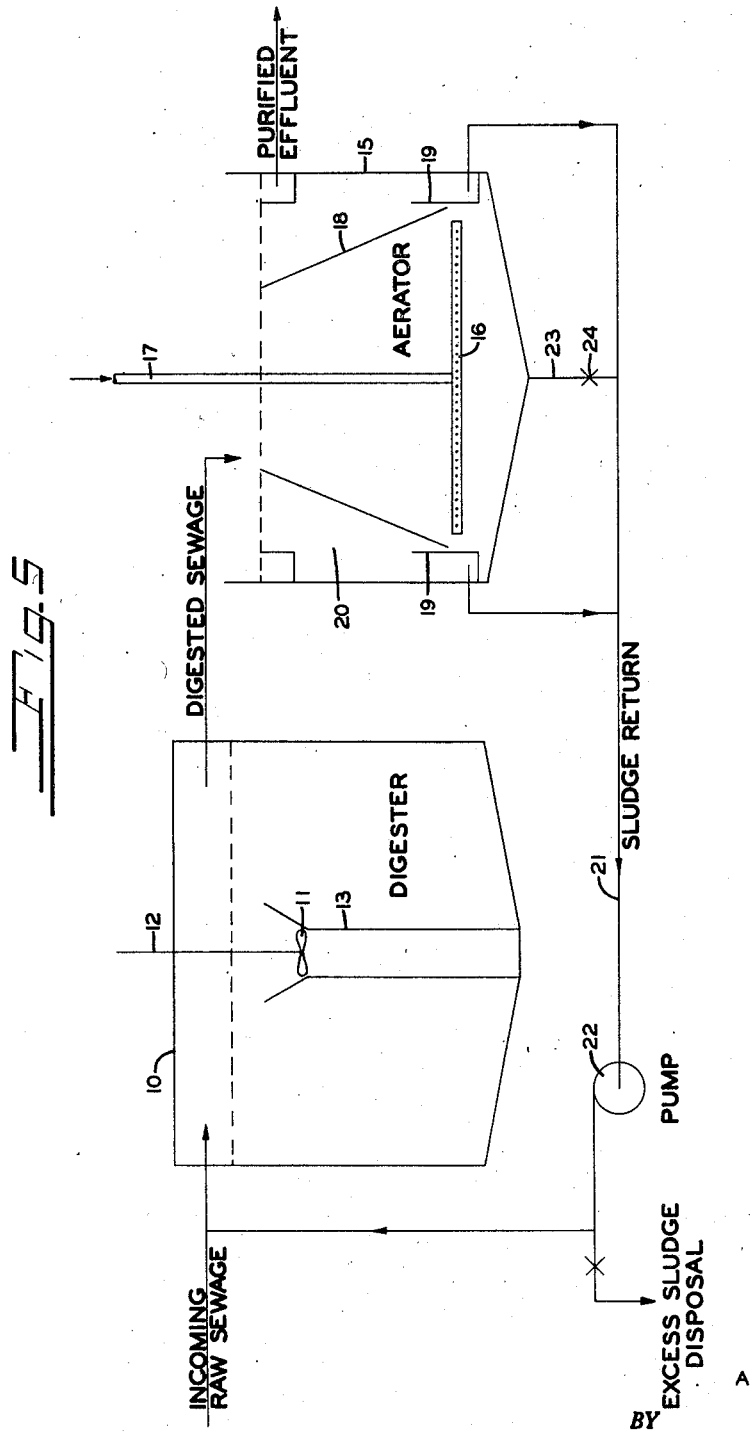

2,788,127

APPARATUS FOR TREATING SEWAGE

Alex B. Davidson, Cincinnati, Ohio, assignor to Schenley Industries, Inc., New York, N. Y., a corporation of Delaware Application April 22, 1952, Serial No. 283,547

4 Claims. (Cl. 210—195)

This inventinon relates to a new and improved apparatus for treating and purifying sewage and, more particularly, to a sewage treatment apparatus which is simpler and more efficient than other presently known types of apparatus intended for this purpose.

There are two principal types of sewage treatment methods in common use today, it being understood that wherever the term "sewage" is used hereinafter in this specification and in the claims, it is intended to include not only domestic waste, but also industrial waste and/or other liquids containing pollutional materials. According to one method, the raw sewage is first settled in clarification tanks; the clear effluent from the clarification tanks is then treated by some aerobic biological method; the effluent from the biological process is then settled, and the clear effluent from the final settling tanks is discharged to the stream or other disposal medium. Another method of sewage treatment is that of anaerobic digestion which is sometimes used to treat a ve.y strong sewage and is also used for treatment of the sludge settled out of sewage in the conventional aerobic process. In the anaerobic process, the sewage is fed into a closed tank which may or may not be heated, depending upon the temperature of the sewage delivered to the disposal plant, the type of waste, and so forth. After the sewage has been sufficiently digested and compacted, a portion of it is then flushed or pumped to sand beds or vacuum filters for drainage and final disposal.

The first mentioned method of treatment, i. e., the aerobic biological method, may be either of two types. One type, the trickling filter method, allows the sewage to trickle down through a bed of stone whereby the organic material therein is oxidized by the action of biologic slimes on the stone. The other method is the activated sludge process in which the liquid sewage is aerated and agitated by compressed air or mechanical means together with the activated sludge returned from the final settlement tanks. In this latter process, i. e., the activated sludge process, the sewage is usually first settled in a clarification tank where the heavier solids settle out leaving a relatively clear effluent which overflows to the aeration units. These aeration units generally consist of tanks equipped with air diffusers located in the bottom thereof which continuously aerate the liquid in the tanks. Alternatively, the sewage may be aerated by mechanical aerators which continuously agitate the liquid sewage contained in the aeration tank. The usual period of aeration in these tanks is from 6 to 8 hours. The liquor in the aeration tanks consists of the mixture of the effluent from the primary clarifiers and return activated sludge. The return activated sludge is obtained from the final clarifier where it is settled out of the "mixed liquor" from the aeration tank and then returned to the aeration tank along with the effluent from the primary clarifiers. This activated sludge is built up from the organisms and waste materials contained in the liquid itself by continued aeration, and when such a disposal plant is started, it generally takes from 2 to 4 weeks to build up a sufficient supply of activated sludge. The sludge consists of flocculent solids maintained in suspension and in an aerobic condition, and it is full of bacterial organisms and other living matter which aid in effecting the oxidation of the pollutional material in the sewage. The sludge returned to the aeration tanks generally amounts to about 20% of the volume of the incoming raw sewage. It has been generally believed that this returned sludge must be kept in an aerobic condition or it becomes "sick" and will not effectively perform its purification function.

In the anaerobic digestion process, the organic material decomposes anaerobically to give methane, carbon dioxide and hydrogen sulfide gases. The process is generally supposed to be considerably slower than the aerobic method of treatment and, it is generally believed that, although anaerobic digestion and aerobic decomposition methods are dependent upon bacterial organisms for their reaction, entirely different types are involved in the two different methods. As previously indicated, the prevalent theory has been that these bacteria cannot be interchanged, that is, that an anaerobic process cannot be allowed to become aerobic and vice versa. It also always has been the belief that the sludge from the anaerobic process and "activated sludge" are totally incompatible and that in an activated sludge plant, an overdose of anaerobic material or sludge will de-activate the activated sludge, making it "sick" and rendering the process inoperative. In fact, the literature is replete with references to the danger of permitting anaerobic waste to enter the activated sludge system in too great a quantity, and it has become a more or less accepted fact that the entrance of too much anaerobic waste into the actively operating activated sludge treatment plant will seriously interfere with the operation of the process by overloading it and making the activated sludge "sick."

Contrary to this belief that an anaerobic process cannot be allowed to become aerobic, and vice versa, I have found that it is possible to actually combine the two systems, that is the aerobic and anaerobic methods of sewage treatment with the following results: a better and more efficient treatment of the sewage is obtained; the system is more reliable and less likely to become upset than the activated sludge system; the initial cost of construction of the plant is less than in the case of conventional treatment plants; the sludge return problem is considerably simplified, and there is practically no "build up" of sludge in the system, thereby eliminating the problem of sludge disposal.

In my novel apparatus for treating and purifying sewage, the influent or raw sewage is introduced into a digestion tank along with sludge returned from the final settlement tank and the two are mixed to form a slurry which is then decomposed anaerobically. The effluent from the digestion tank is then passed into an aeration tank where it is agitated and aerated in the customary manner. The aerated liquor is then settled so as to separate the sludge from the purified effluent which is discharged from the aeration tank and carried away for disposal. The sludge is then returned to the digestion tank for reintroduction into the system in conjunction with the raw sewage. It will thus be seen that my novel apparatus involves the complete interchange of the sewage being treated from anaerobic conditions to aerobic conditions, and then the return and interchange of the aerated sludge with the incoming raw sewage. In view of the successful results achieved by use of my novel apparatus in which the anaerobic and aerobic treatments are combined to effect a more rapid and more efficient purification of the sewage, it would appear that the bacteria involved in the reduction of the sewage are facultative bacteria which can perform their functions either anaerobically or aerobically.

Accordingly, it is an object of the present invention to provide a new and improved apparatus for treating sewage by a combination of anaerobic and aerobic treatments successively. While this type of apparatus is contrary to and at variance with all past theories on the subject, I have been able to achieve remarkable results with my novel type of apparatus in which these forms of treatment are combined.

Another object of the invention is to provide a novel type of sewage treatment apparatus in which the time and cost of treatment is materially reduced.

Another object of the invention is to provide a sewage treatment apparatus consisting of a digestion tank, an aeration tank, a device of clarifying the aerated sewage and settling out the sludge, and means for returning the sludge to the digestion tank for introduction therein along with the raw sewage.

Another object is to provide a novel apparatus in which sludge and raw sewage are introduced together into a digestion tank to form a slurry together with means for clarifying the effluent from the digestion tank and separating the sludge therefrom.

With these and other objects in view which will become apparent from the following description, the invention will hereinafter be explained with reference to the accompanying drawings which form a part of this specification.

In the drawings:

Fig. 1 is a plan view of my novel sewage treatment and purifying apparatus.

Fig. 2 is a side elevation of the sewage treatment apparatus shown in Fig. 1, as viewed on line 2—2 in Fig. 1.

Fig. 3 is a detail view taken along the line 3—3 in Fig. 1.

Fig. 4 is a detail view showing the air injector pump for returning the sludge to the digestion tank.

Fig. 5 is a view showing the apparatus in greatly simplified form and illustrating the flow of material through the apparatus.

Referring first to Fig. 5, where my novel apparatus is shown reduced to its simplest form and wherein the flow of sewage and sludge through the system is indicated diagrammatically, it will be seen that the incoming raw sewage to be treated is first introduced into a digestion tank 10 along with the sludge returned from the clarifier portion of the aeration unit. The raw sewage and sludge are mixed together in the digestion tank by means of an impeller 11 carried on a drive shaft 12 and operating in the upper end of a draft tube 13 centrally disposed within the tank. The raw sewage and sludge are thereby maintained in the form of a slurry while digestion is taking place. The tank, or the contents thereof, may or may not be heated during the digestion process as may be necessary or desirable in accordance with the character of the sewage being treated. After the slurry contained within the tank 10 has been digested, it is passed from the tank 10 into an aeration tank 15 where it is agitated and aerated by means of an air manifold 16 to which air is supplied from an air pressure line 17. The aeration tank 15 is provided with a cone-shaped baffle 18 which is supported centrally within the tank. Lying outside of the baffle 18 and around the bottom edge of the tank 15 are a series of sludge concentrators 19. Here, the sludge settling out of the liquor lying in the relatively quiet zone 20 on the outside of the baffle 18 will be concentrated. This sludge is drawn off from the concentrators through a sludge return line 21 and is forced by a pump 22 back into the digestion tank 10 along with the incoming raw sewage. If desired, sludge may also be drawn from the bottom of the aeration tank 15, through a line 23 provided with a valve 24 and connecting with the return line 21. At the same time, the purified effluent from the aeration tank 15 is drawn off from the top of the tank and led away through a pipe to the point of disposal.

From this brief description of my improved type of sewage treatment apparatus it will be seen that the incoming raw sewage is first mixed with sludge and subjected to anaerobic digestion, after which it is led into an aeration tank where it is agitated and aerated to bring about aerobic decomposition of the waste materials contained in the sewage. The sludge settled out of the aerated liquor is returned to the digestion tank while the purified effluent is disposed of in any suitable manner.

As one illustration of a specific embodiment of my invention, I have shown in Figs. 1 and 2 of the drawings, the plan and side elevations of a sewage disposal plant incorporating the novel features of my invention. As shown in Figs. 1 and 2, the digestion tank 10 is located adjacent a pump house 30 which serves to house a rotary blower or air compressor 31 which supplies air under pressure to the aeration tank 15 and also to the air injector pump which serves to return the sludge from the sludge concentrators 19 to the digestion tank 10. Raw sewage to be treated is brought into the plant through a pipe 32 which discharges into a primary well 33 located on top of the digestor tank 10. Also discharging into the primary well 33 is a sludge, air-lift, riser 34 whereby sludge may be introduced along with the raw sewage into the digestion tank 10. The digestion tank is preferably provided with an agitator 11 carried on a drive shaft 12 which is arranged to be driven by an electric motor 35 (Fig. 1) mounted on top of the tank 10. The impeller 11 is located in the upper end of a draft tube 13 which is vertically disposed in the center of the tank 10 with the result that the mixture of raw sewage and sludge is agitated and mixed within the digestion tank and maintained in the form of a slurry while anaerobic digestion is taking place.

After the mixed sewage and sludge in the digestion tank 10 have been subjected to anaerobic digestion for a sufficient length of time to reduce the raw sewage, the slurry is drawn off through an effluent pipe 36 which leads the digested sewage from the supernatant well 37 of the digestion tank to a riser 38 provided within the aeration tank 15. Thus, the digested sewage is discharged into the aeration tank inside of the baffle 18. Here the anaerobically digested sewage will be subjected to agitation and aeration by means of air discharged from the air manifold 16 which bubbles up through the liquor lying inside the baffle 18. Air is supplied to the manifold 16 through an air pressure line 17 which leads from the air compressor 31 located in the pump house 30 to the air manifold 16.

As shown in Fig. 2, the baffle 18 is frusto-conical in shape and is suspended centrally within the tank 15 by means of suspension links 41. The baffle 18 serves to prevent the agitation of liquor created by the air manifold 16 within the central portion of the tank from disturbing the liquor lying in the space 20 between the wall of the aeration tank and the baffle 18. Hence, the sludge will be permitted to settle out of the liquor contained in the quiet zone 20 and will be caught by the sludge concentrators 19 lying around the periphery of the tank 15 near the bottom thereof. The purified effluent from the aeration tank 15 is drawn off through a well 42 after passing over a scum baffle plate 43 and a weir plate 44 into a gutter 45 which communicates with the well 42. An effluent line 46 conveys the effluent from the well 42 into a recirculating well 47 from whence the effluent passes over a weir plate 48 and out of the plant through a final effluent or disposal line 49.

Provision is made for by-passing a portion of the digested waste from the tank 10 into the recirculating well 47 should this become necessary or desirable. For this purpose, a by-pass pipe 50 leads from the supernatant well 37 to a T-connector 51 provided in the effluent line 46. A valve 52 (Fig. 2) is provided in the pipe 50 just below the well 37 so that by-passing of digested waste from the tank 10 may be controlled by manipulation of the valve 52.

The sludge settled in the concentrators 19 may be withdrawn therefrom through the draw-off connections shown in Figs. 1 and 3. As therein shown, each concentrator 19 is provided with a draw-off nozzle 55 which is connected by a cut-off valve 56 with a draw-off pipe 57. The pipes 57 are connected with branch lines 58 and 59 which, in turn, are connected with the sludge return line 21. The heavier particles of sludge, which are capable of settling in the central portion of the tank despite the agitation created by the air manifold 16, may be drawn off through a sludge return line 23 connected with the bottom of the tank as shown in Fig. 2.

As shown in Fig. 4, the sludge return lines 21 and 23 are connected through valves 60 and 24, respectively, with a cross-union 61. The union 61 is, in turn, connected with an air injector pump 62 which is connected by an air pressure line 63 and a manually operable valve 64 with the air compressor 31. Hence, when either valve 24 or 60 is opened and air is supplied to the air injector pump 62 through the line 63, sludge will be drawn through sludge return lines 23 or 21 and forced up through riser 34 into the primary well 33 of the digestion tank 10. In this way, sludge may be returned either from the sludge concentrators 19 into the primary well 33 of the digestion tank 10, or from the bottom of the aeration tank 15 through the return line 23 and thence into the primary well 33 of the tank 10. The sludge thus returned is thereafter mixed within the digestion tank with the incoming raw sewage which enters the primary well 33 through the influent line 32. The sewage and sludge will be mixed by the impeller 11 operating in the draft tube 13 so as to form a slurry within the digestion tank 10 in the manner previously described. After the sewage and sludge have been digested within the tank 10, either with or without heating as may be required in order to effect digestion of the waste within a reasonable retention time within the tank, the digested effluent passes through pipe 36 into aeration tank 15 where it is agitated and aerated so as to effect aerobic decomposition of the waste matter contained therein. The sludge which settles out in the concentrators 19, or in the bottom of the aeration tank, is returned through lines 21 and 23 to air injector pump 62 which lifts the sludge through riser 34 into the primary well 33 of the digestion tank. The purified effluent from the aeration tank 15 is led from the tank through pipe 46 into the recirculating well 47 after which it is carried away from the plant through the final effluent disposal pipe 49.

It will be understood that the apparatus shown and described herein is intended only for purposes of illustration and is not intended to restrict or limit the invention embodied therein. It is to be realized, also, that various changes and modifications might be made in the arrangement and design of the apparatus disclosed herein without departing from the spirit or scope of the invention as defined by the claims appended hereto.

What I claim as new and useful and desire to secure by United States Letters Patent is:

1. A sewage aeration and clarification apparatus comprising a tank for containing the sewage to be aerated and clarified, a vertical baffle for separating the tank into a central agitation zone and a peripheral sedimentation zone, means located in the central zone of said tank and within the confines of said baffle for agitating and aerating the sewage therein, and means located outside of said baffle and around the periphery of said tank for collecting the sludge settled out of the sewage in said sedimentation zone, said collecting means including a series of receptacles spaced about the periphery of said tank near the bottom thereof.

2. The sewage aeration and clarification apparatus of claim 1 in which each receptacle is V-shaped in the circumferential direction.

3. The sewage aeration and clarification apparatus of claim 2, including a nozzle adjacent to the bottom of each receptacle for drawing off the sludge collected by said receptacle.

4. A sewage treatment and purifying apparatus comprising an enclosed digestion tank, means for introducing raw sewage and sludge into said tank, mechanical means for continuously stirring the entire contents of said tank in the absence of air to form a slurry therein, an open aeration tank, means for conveying the digested slurry from said digestion tank to said aeration tank, means in said aeration tank for agitating said slurry in the presence of air to provide aerobic treatment thereof, means in said aeration tank for providing a quiescent settlement zone therein for clarifying the aerated slurry to separate the sludge from the purified effluent, and an air injector pump for withdrawing the sludge from said clarifying means and discharging it into said digestion tank.

References Cited in the file of this patent

UNITED STATES PATENTS

| | | |
|---|---|---|
| 2,129,266 | Fischer et al. | Sept. 6, 1938 |
| 2,132,837 | Talbot | Oct. 11, 1938 |
| 2,348,125 | Green | May 2, 1944 |
| 2,430,519 | Mallory | Nov. 11, 1947 |
| 2,465,658 | Nussberger | Mar. 29, 1949 |
| 2,506,927 | Kelly | May 9, 1950 |
| 2,528,649 | Genter et al. | Nov. 7, 1950 |
| 2,553,228 | Yonner | May 15, 1951 |
| 2,568,452 | Kelly et al. | Sept. 18, 1951 |
| 2,605,220 | Logan | July 29, 1952 |
| 2,616,848 | Griffith | Nov. 4, 1952 |
| 2,678,913 | Kalinske | May 18, 1954 |

FOREIGN PATENTS

| | | |
|---|---|---|
| 188,958 | Great Britain | Nov. 23, 1922 |